United States Patent
Porter et al.

(10) Patent No.: US 8,555,481 B2
(45) Date of Patent: Oct. 15, 2013

(54) MULTI-PIECE FASTENER WITH SELF-INDEXING NUT

(75) Inventors: John R. Porter, Lynnwood, WA (US); Antonio Rufin, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/400,354

(22) Filed: Mar. 5, 2012

(65) Prior Publication Data

US 2012/0144653 A1    Jun. 14, 2012

Related U.S. Application Data

(60) Division of application No. 12/359,961, filed on Jan. 26, 2009, now Pat. No. 8,142,126, which is a continuation-in-part of application No. 11/162,260, filed on Sep. 2, 2005, now abandoned.

(51) Int. Cl.
  *B23P 11/00* (2006.01)
  *F16B 39/32* (2006.01)

(52) U.S. Cl.
  USPC .................. 29/525.02; 411/389; 411/327

(58) Field of Classification Search
  USPC ........ 411/116, 190–337, 388, 389; 29/525.02
  See application file for complete search history.

(56) References Cited

U.S. PATENT DOCUMENTS

| | | |
|---|---|---|
| 83,225 A | 10/1868 | Tudor |
| 488,958 A | 12/1892 | Bosmann |
| 601,915 A | 4/1898 | Thurmend |
| 1,147,595 A | 7/1915 | Barb |
| 1,210,669 A | 1/1917 | Mike |
| 1,315,107 A | 9/1919 | Fitzpatrick |
| 1,361,627 A | 12/1920 | Scray |
| 1,408,993 A | 3/1922 | Eberhardt |
| 1,639,211 A | 10/1926 | Campo |
| 1,664,944 A | 4/1928 | Ritter |
| 1,677,269 A * | 7/1928 | Burghart ............ 411/5 |
| 2,060,593 A | 11/1936 | Schaurte |
| 2,361,491 A * | 10/1944 | Nagin ............ 411/347 |
| 2,383,935 A | 9/1945 | Dean |

(Continued)

FOREIGN PATENT DOCUMENTS

| | | |
|---|---|---|
| JP | 11247819 | 9/1999 |
| JP | 2001055711 | 2/2001 |

OTHER PUBLICATIONS

Avibank, "Self-Retaining Bolts & Nuts", https://www.avibank.com/index.cfm?fuseaction=home.cat&cat_id=35, retrieved on Dec. 1, 2011, Copyright 2008.

(Continued)

*Primary Examiner* — David Bryant
*Assistant Examiner* — Jacob Cigna
(74) *Attorney, Agent, or Firm* — Ostrager Chong Flaherty & Broitman P.C.

(57) ABSTRACT

According to a preferred embodiment, a multi-piece fastener with self-indexing nut is disclosed. The multi-piece fastener is designed for use in low clearance areas such as aircraft wing side-of-body joint locations. The multi-piece fastener comprises a stud comprising an elongated part extending between a first end face and a second end face, a threaded head fastener, a threaded tail fastener, and a wrenching feature. A self-indexing feature is provided on the stud and head fastener which allows automatic orientation of the head fastener with respect to the stud.

12 Claims, 7 Drawing Sheets

(56) References Cited

U.S. PATENT DOCUMENTS

| | | | |
|---|---|---|---|
| 2,838,260 A | 6/1958 | Christensen | |
| 2,850,934 A | 9/1958 | Sehn | |
| 3,025,730 A | 3/1962 | Brilmyer | |
| 3,180,390 A | 4/1965 | Ockhert | |
| 3,386,138 A | 6/1968 | Overman | |
| 3,390,712 A | 7/1968 | McKay | |
| 3,394,623 A | 7/1968 | Kinakin | |
| 3,408,887 A | 11/1968 | Villo | |
| 3,492,906 A | 2/1970 | Hauser | |
| 3,499,622 A | 3/1970 | Surcin | |
| 3,561,516 A | 2/1971 | Reddy | |
| 3,592,250 A * | 7/1971 | Petroshanoff | 411/320 |
| 3,712,356 A * | 1/1973 | Petroshanoff | 411/208 |
| 3,812,757 A * | 5/1974 | Reiland | 411/5 |
| 4,285,377 A | 8/1981 | Hart | |
| 4,492,500 A | 1/1985 | Ewing | |
| 4,507,034 A | 3/1985 | Lew et al. | |
| 4,655,657 A | 4/1987 | Duran | |
| 4,725,174 A | 2/1988 | Silcox | |
| 4,729,707 A | 3/1988 | Takahashi | |
| 4,759,671 A * | 7/1988 | Duran | 411/347 |
| 4,810,145 A | 3/1989 | Villas | |
| 5,076,748 A | 12/1991 | Waterfield | |
| 5,108,238 A | 4/1992 | Ewing | |
| 5,193,956 A * | 3/1993 | Duran | 411/33 |
| 5,224,806 A | 7/1993 | Duran | |
| 5,284,408 A * | 2/1994 | Duran et al. | 411/33 |
| 5,518,208 A | 5/1996 | Roseburg | |
| 5,647,710 A * | 7/1997 | Cushman | 411/397 |
| 5,944,286 A | 8/1999 | Morris et al. | |
| 6,073,405 A | 6/2000 | Kasai et al. | |
| 6,173,925 B1 | 1/2001 | Mueller et al. | |
| 6,314,630 B1 | 11/2001 | Munk et al. | |
| 6,416,102 B1 | 7/2002 | Howard | |
| 6,540,460 B2 * | 4/2003 | Miranda et al. | 411/5 |
| 6,659,699 B2 | 12/2003 | Stoewer et al. | |
| 6,786,452 B2 | 9/2004 | Yamashita et al. | |
| 6,808,143 B2 | 10/2004 | Munk et al. | |
| 6,849,150 B1 | 2/2005 | Schmidt | |
| 6,872,039 B2 * | 3/2005 | Baus et al. | 411/347 |
| 6,872,041 B2 | 3/2005 | Lohr | |
| 7,147,420 B2 | 12/2006 | Baus | |
| 7,195,418 B2 | 3/2007 | Durand et al. | |
| 2,407,480 A1 | 1/2009 | Dean | |
| 8,142,126 B2 * | 3/2012 | Porter et al. | 411/389 |
| 2002/0078545 A1 | 6/2002 | Munk et al. | |
| 2005/0158147 A1 | 7/2005 | Baus | |
| 2007/0051851 A1 * | 3/2007 | Ruffin et al. | 244/131 |

OTHER PUBLICATIONS

Avibank, "Thread End Release Pawl", https://www.avibank.com/index.cfm?fuseaction=home.prods&product_id=38, retrieved on Dec. 22, 2008, Copyright 2008.

R.L. Ramkumar et al., Design Guide for Bolted Joints in Composite Structures, Mar. 1986, US Air Force (Unclassified).

\* cited by examiner

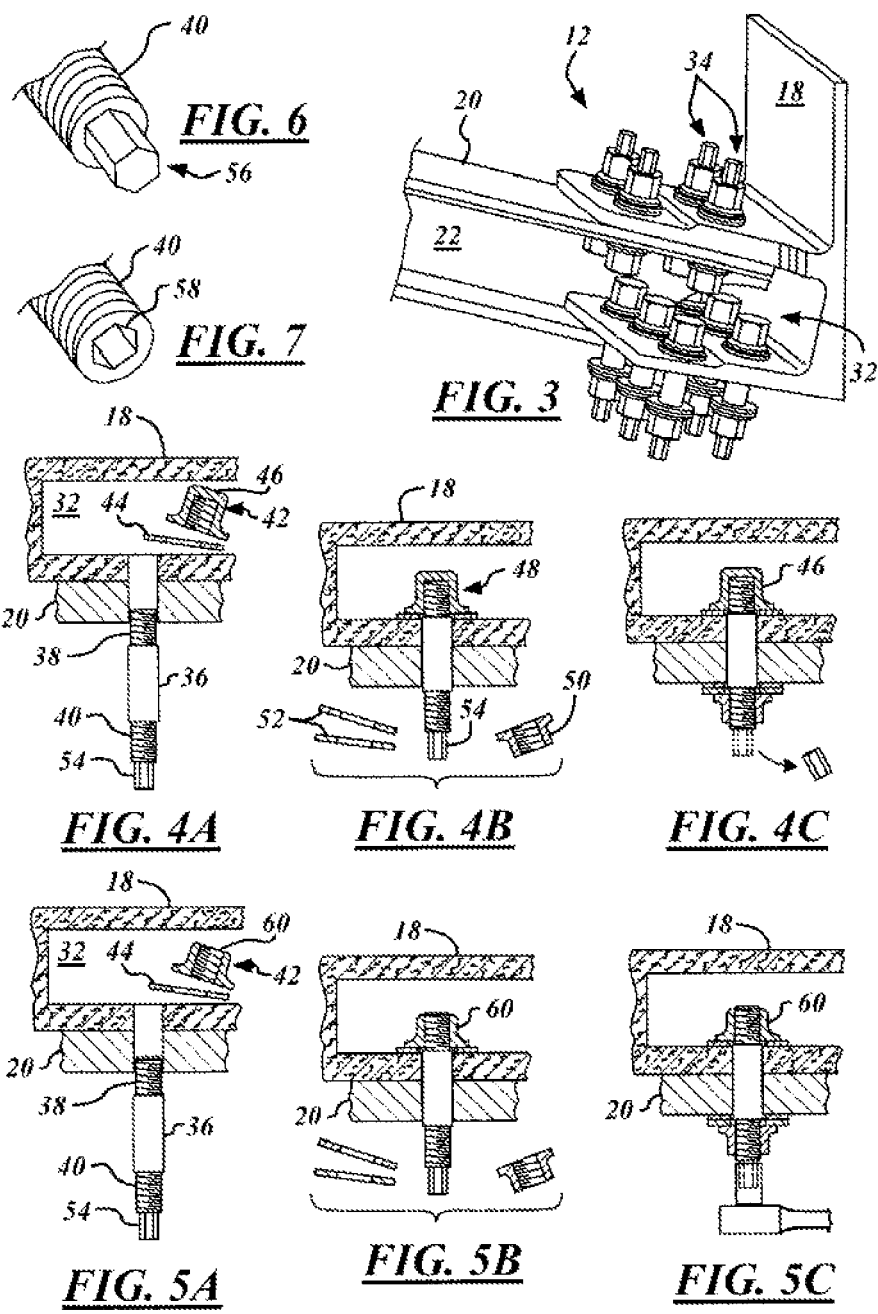

MULTI-PIECE FASTENER WITH SELF-INDEXING NUT

RELATED APPLICATION

This application is a divisional of, and claims priority from, pending prior application Ser. No. 12/359,961 filed Jan. 26, 2009, issued as U.S. Pat. No. 8,142,126 on Mar. 27, 2012, which is incorporated by reference herein in its entirety, and which is a continuation-in-part of prior application Ser. No. 11/162,260 filed Sep. 2, 2005 now abandoned, which is also incorporated by reference herein in its entirety.

TECHNICAL FIELD

The present invention relates generally to a method and apparatus for improving installation of joint elements in limited clearance situations, and more particularly to a method and apparatus utilizing a multi-piece fastener to secure joint elements.

BACKGROUND

Aerospace and military applications often provide unique challenges to design and manufacturing. Often manufacturing requires the assembly of multiple elements within regions providing limited clearance and reduced accessibility. Traditional attachment methodologies and fasteners may be difficult to position within such regions. In addition, assembly of such structures commonly requires precise tensioning of such fasteners to minimize stresses and insure proper functioning. The use of traditional fasteners, such as commonly used bolt assemblies, can result in difficult installation, ergonomic issues, inconsistent torque application, and sub-optimum joint fatigue performance.

One such assembly that suffers from the aforementioned concerns is the wing side-of-body joint assembly used in aerospace applications. The wing side-of-body joint is configured around chordwise stiffeners, typically referred to as chords, used to transmit wing skin and stringer loads into the body and wing center structure. Presently, the fasteners used in this application are high strength protruding head bolts and nuts. The limited clearance present in the chord elements, however, dictates undesirable constraints on how the bolts may be orientated and their installation sequence. Often, limited clearance may make traditional bolt assemblies virtually impossible to utilize or re-torque after installation.

It is also highly desirable to torque bolts from the nut side. Such nut-side torque application is known to deliver consistent optimum joint fatigue performance. Torque application from the head side often results in the bolt turning inside the hole, which can score the bolt and/or fastener and result in galling and improper bolt tensioning. Therefore, it is highly desirable for the fastener assemblies utilized in the wing side-of-body joint assembly to be torqued from the nut side. The limited clearance imposed by the chord elements, however, makes such nut-side torque application unfeasible in certain locations.

What is needed is a method and fastener assembly that is suited for assembly within reduced clearance regions of the joint assembly. Additionally, it would be highly desirable to have a method and fastener assembly that would allow for nut-side only torque application even within such reduced clearance regions.

Further difficulties arise where a fastener assembly requires a precisely tightened nut (threaded head fastener). In wing-side of body joints with low clearance regions, nuts may require tightening to a precise orientation. With prior solutions, this had been done as follows: One end of a bolt is inserted into a low clearance region, and a nut is inserted into the low clearance region. The nut is tightened to some arbitrary degree onto the bolt and then examined to see whether the orientation meets what is required. If the nut is not in the proper orientation, then the nut must be adjusted again. This process must be repeated until proper orientation is achieved. As the nut is located in a low clearance region, examination of the nut is difficult or impossible while it is being tightened. This tightening and re-tightening process requires much trial and error which is time-consuming and difficult. Therefore there exists a need for a fastener which can quickly, easily, and accurately be tightened to a specific orientation.

SUMMARY

In accordance with the present invention an aerospace wing side body joint assembly is provided comprising at least one chord element, having an internal reduced clearance region, and at least one skin element. At least one cylindrical bolt assembly passes through the chord element and the skin element and secures them together. The cylindrical bolt assembly is comprised of a cylindrical stud having a threaded tail section and is used a threaded head section protruding into the internal reduced clearance region. A threaded head fastener inserted into the internal reduced clearance region engages the threaded head section. A nut element (threaded tail fastener) engages the threaded tail section and is used to introduce a torque without rotating the cylindrical stud.

Further in accordance with the present invention, a spring loaded stop projection (pawl) on the stud and stop indentations on the threaded head fastener are provided to allow the threaded head fastener to automatically stop at a desired orientation. Upon insertion of the bolt into the head fastener, the projection on the bolt is depressed such that the head fastener can rotate over the projection and be fastened onto the stud. As the head fastener is being tightened onto the stud, the stop projection continues to be depressed until it pops up into an indentation in the threaded head fastener. At this point, the head fastener is immobile relative to the stud, ensuring that further rotation is no longer possible and that the head fastener is in proper orientation with respect to the stud. This system may be referred to as a self-indexing nut system.

Other objects and features of the present invention will become apparent when viewed in light of the detailed description and preferred embodiment when taken in conjunction with the attached drawings and claims.

BRIEF DESCRIPTION OF THE DRAWINGS

FIG. 3 is a detailed illustration of a portion of the wing side-of-body joint assembly illustrated in FIG. 2.

FIGS. 4A-C are detailed illustrations of an assembly of the wing side-of-body joint assembly illustrated in FIG. 2.

FIG. 5A-C are detailed illustrations of an alternate assembly of the wing side-of-body joint assembly illustrated in FIG. 2.

FIG. 6 is a detailed illustration of a cylindrical stud for use in the wing side-of-body joint assembly illustrated in FIG. 2.

FIG. 7 is a detailed illustration of an alternate cylindrical stud for use in the wing side-of-body joint assembly illustrated in FIG. 2.

DESCRIPTION OF PREFERRED EMBODIMENTS

Figure 1:
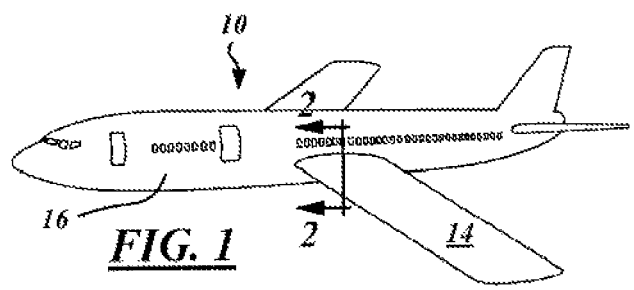
FIG. 1 is an illustration of an aircraft in accordance with the present invention.

Referring now to FIG. 1, which is an illustration of an aircraft 10 in accordance with the present invention. The aircraft 10 is comprised of a plurality of joint assemblies wherein traditional fastening and assembly techniques may unfeasible or cost prohibitive. One such joint assembly is referred to as the wing side-of-body joint assembly 12, see FIG. 2. The wing side-of-body joint assembly 12 is located where the wing 14 joints the aircraft body side 16. This joint assembly 12 is very important as it is used to join a variety of structures together to form a reliable joint that is preferably highly resistant to joint fatigue.

Figure 2:
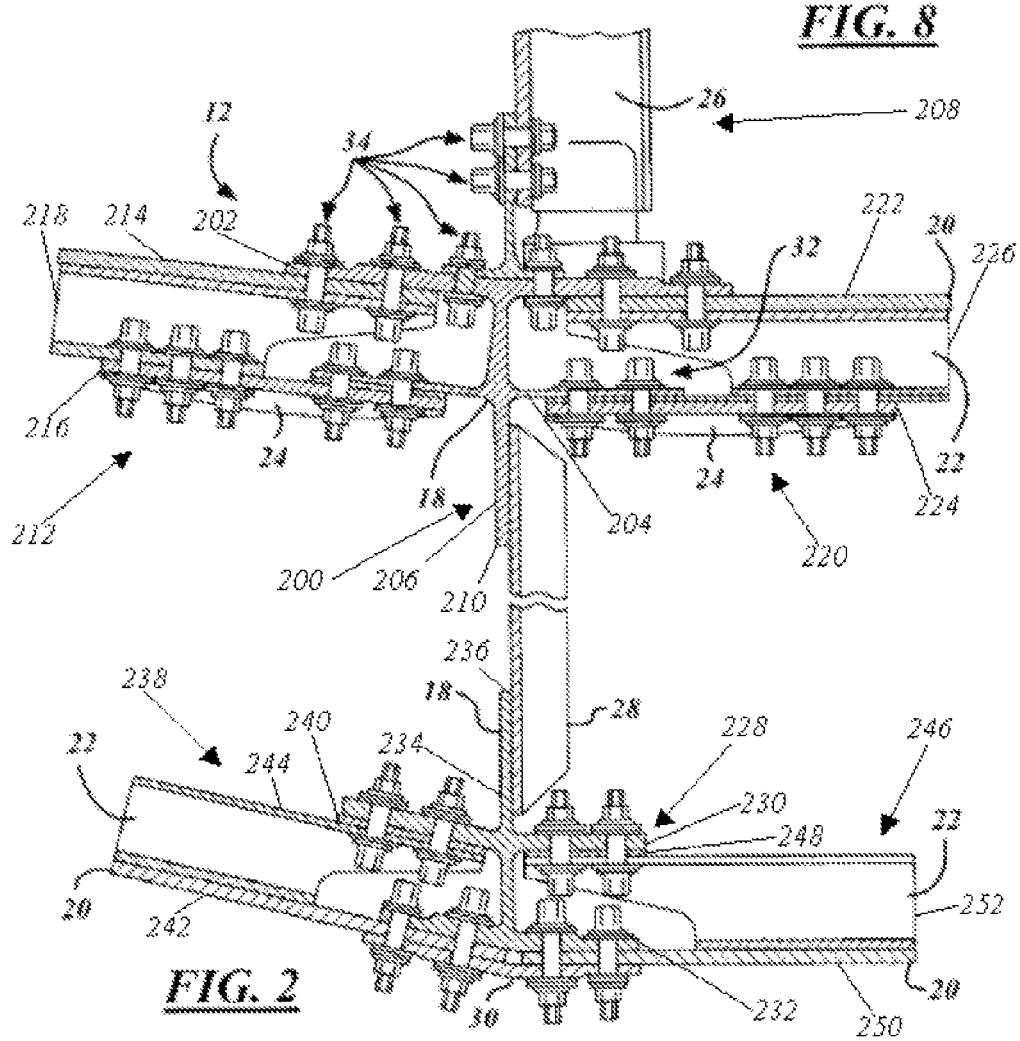
FIG. 2 is a detailed illustration of a wing side-of-body joint assembly for use in the aircraft illustrated in FIG. 1.

As illustrated in FIG. 2, the joint assembly 12 is used to join a variety of different structures. Aluminum or titanium chords 18, also referred to as a first joint element, are utilized to join primary structures such as aluminum or carbon fiber-reinforced composite skin elements 20, also referred to as a second joint element, stringers 22, stringer fittings 24, and body frames 26. In addition, the chords 18 are utilized to affix additional stiffeners such as body web stiffeners 28 and spice plates 30. Thus the joint assembly 12 joins a wide plurality of structures and must do so reliably and efficiently.

One embodiment of a wing side-of-body joint is described in further detail below.

A body frame section 26 is a part of the aircraft body side 16 and is found at the point on the aircraft body to which the wing 14 connects. It is fastened to the upper supporting chord element 200, described below.

The main components of one embodiment of a wing side of body joint include an upper supporting chord element 200 and a lower supporting chord element 228, an upper wing section 212 and a lower wing section 238, and an upper interior section 220 and a lower interior section 246.

The upper and lower supporting chord elements 200 and 228 have a cross-section resembling a crossed capital T, and comprise a middle chord layer 204 and 230 and a top or bottom chord layer 202 and 232 which are substantially parallel to each other, and are connected by a central wall chord layer 206 and 234, which runs perpendicular to both top or bottom 202 and 232 and middle chord layer 204 and 230. A portion of the wall chord layer 206 and 234, the extension 210 and 236, extends from the middle chord layer 204 and 230 and is used to connect the upper and lower supporting chord elements 200 and 228.

The upper wing section 212 comprises an upper skin layer 214 and a lower skin layer 216, and a stringer element 218 therebetween. The upper skin layer 214 and lower skin layer 216 are fastened to the top chord layer 202 and middle chord layer 204 of the upper supporting chord element 200, respectively, each being fastened with fasteners 34. The lower skin layer 216 of the upper wing section 212 is overlaid upon the middle chord layer 204 and the stringer 218, and is fastened to both of those parts. Overlaid upon and connecting to the lower skin layer 216 may be a stringer fitting 24.

The upper interior section 220 comprises an upper skin layer 222 and lower skin layer 224, and a stringer 226 therebetween. The upper and lower skin layers 222 and 224 are fastened to the top and middle chord layers 202 and 204 of the upper supporting chord element, respectively, each being fastened with fasteners 34. The lower skin layer 224 of the upper interior section 220 is overlaid upon the middle chord layer 204 and the stringer 226, and is fastened to both of those parts. Overlaid upon and connecting to the lower skin layer 224 may be a stringer fitting 24.

The lower wing section 238 comprises an upper skin layer 240, a lower skin layer 242, and a stringer element 244 therebetween. The upper skin layer 240 is fastened to the middle chord layer 230 of the lower supporting chord element 228 with fasteners 34 and the lower skin layer 242 is connected to the lower chord layer 232 of the lower supporting chord element 228 with fasteners 34. A portion of the stringer 244 is also overlaid upon and connected to the middle chord layer 230 of the lower supporting chord element 228.

The lower inner section 246 comprises an upper skin layer 248, a lower skin layer 250, and a stringer 252 therebetween. The upper skin layer 248 is fastened to the middle chord layer 230 of the lower supporting chord element 228 with fasteners 34 and the lower skin layer 250 is connected to the lower chord layer 232 of the lower supporting chord element 228 with fasteners 34. A portion of the stringer 252 is also adjacent to and connected to the middle chord layer 230 of the lower supporting chord element 228.

A spice plate 30 is adjacent to and fastened with fasteners 34 to the lower skin layers 242 and 250 of the lower wing section 238 and lower inner section 246. The spice plate 30 serves to fasten the skin elements 242 and 250 together.

The extensions 210 and 236 of the upper and lower supporting chord elements 200 and 228 are each connected to a body web stiffener 28, thereby connecting the upper and lower portions together.

An issue often arises with wing side-of-body joint assemblies 12 when joint elements such as the chord elements 18 are configured to produce internal reduced clearance regions 32. As can be visually seen in FIG. 2, when such chord elements 18 have such reduced clearance regions 32 in addition to being fastened on multiple sides, the ability to position traditional headed bolts into the reduced clearance region 32 may be difficult or impossible. In addition, the ability to nut-side tighten to prevent bolt rotation may be increasingly difficult with existing designs. The present invention, however, utilizes a special cylindrical bolt assembly 34 to allow simplified joint assembly and reliable nut side torque application.

A simplified detail of the joint assembly 12 is illustrated in FIGS. 3 and 4A-C. The present cylindrical bolt assemblies 34 are comprised of a cylindrical stud 36 having a threaded head section 38 and a threaded tail section (nut) 40. The threaded head section 38 allows the cylindrical stud 36 to be pushed from outside the reduced clearance region 32 through both the chord 18 and skin 20. This way, only a threaded head fastener 42, and possibly head washers 44, need be navigated into the reduced clearance region 32 rather than an entire bolt assembly. This drastically reduces assembly difficulties. In addition, the present invention contemplates the use of a cap nut 46 as the threaded head fastener 42. The cap nut 46 may be tightened down against the cylindrical stud 36 until the end of the stud 36 on the threaded head section 38 contacts the bottom of the cap nut 46, thus limiting further rotation of the nut 46 and forming a rigid fastener head 48. A crimp or non-metallic insert in the cap nut 46 ensures that the nut 46 remains firmly locked in place after the fastener installation is complete. In this fashion, all the benefits of a traditional solid head bolt are achieved without the assembly difficulties. A nut element 50, in combination with tail washers 52, may be torqued onto the cylindrical stud 36 without rotation of the stud by restraining rotation of the cap nut 46 with a conventional wrench.

Figure 8:
FIG. 8 is a detailed illustration of an alternate cylindrical stud for use in the wing side-of-body joint assembly illustrated in FIG. 2.

Although the formation of a rigid fastener head 48, as described above, will preclude stud rotation during installation of the nut element 50, the present invention further contemplates the use of a wrenching features 54 formed on the threaded tail section 40. The wrenching feature 54 is intended to encompass a wide variety of features capable of restraining rotation of the cylindrical stud 36 without requiring access to the threaded head fastener 42. These include, but are not limited to, prismatic extensions 56 as shown in FIG. 6, hexagonal recesses 58 as shown in FIG. 7, and spline recesses 59 as shown in FIG. 8. The wrenching features are restrained with a corresponding wrench or key to secure the cylindrical stud 36 while torque is applied purely to the nut element 50.

In addition, the wrenching feature 54 allows for the use of an open head nut 60 as the threaded head fastener 42, as shown in FIGS. 5A-5C. The open head nut 60 is threaded onto the threaded head section 38 until the desired thread protrusion level is achieved. Thread protrusion is the length of thread from the threaded head section 38 projecting past the nut 60 as it is installed, and is commonly used as a means to ensure proper engagement of typical bolt and nut elements. During this operation, rotation of the stud 36 is prevented by reacting the nut 60 locking torque at the wrenching feature 54. Installation of the nut element 50 is then accomplished by applying a torque to the nut element 50 and using the wrenching feature 54 to keep the stud 36 from rotating. This allows for a standard nut to be utilized as the threaded head fastener 42 which may reduce cost and simplify disassembly should it be desirable. A threaded head fastener with stop features (indentation) 112 may also be used to provide automatic orientation of the head fastener 110 with respect to the stud 36 and 120. Finally, as an added feature to reduce weight or further conserve space, the wrenching feature 54 may be frangible as shown in FIG. 4C. This means that after its use to restrain the cylindrical stud 36 while torque is applied to the nut element 50, the wrenching feature 54 may be broken off to reduce weight or improve accessibility to other joint regions.

Figure 9:
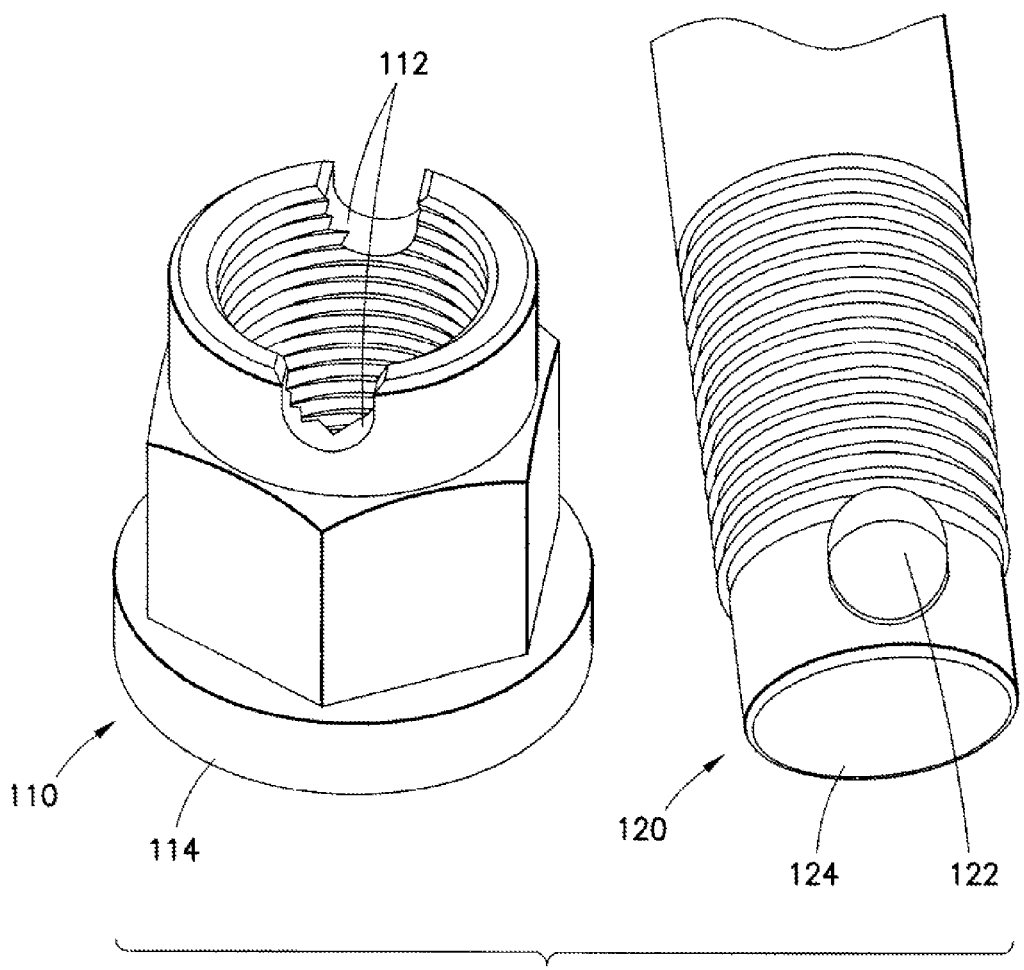
FIG. 9 depicts an embodiment of a fastening device, including a threaded head fastener with stop indentations and a stud with stop projections.

A mechanism to automatically orient the threaded head fastener 110 with respect to the stud 120 is provided in FIGS. 9-12. Referring now to FIG. 9, a cylindrical bolt assembly with a threaded head fastener 110 with stop indentations 112 and stud 120 exhibiting the stop projections 122 are shown. The nut has two stop indentations 112 into which two stop projections 122 fit, to lock the threaded head fastener in the proper orientation with respect to the bolt. The threaded head fastener also comprises a base 114, into which the second end 124 of the stud 120 fits.

Figure 10:
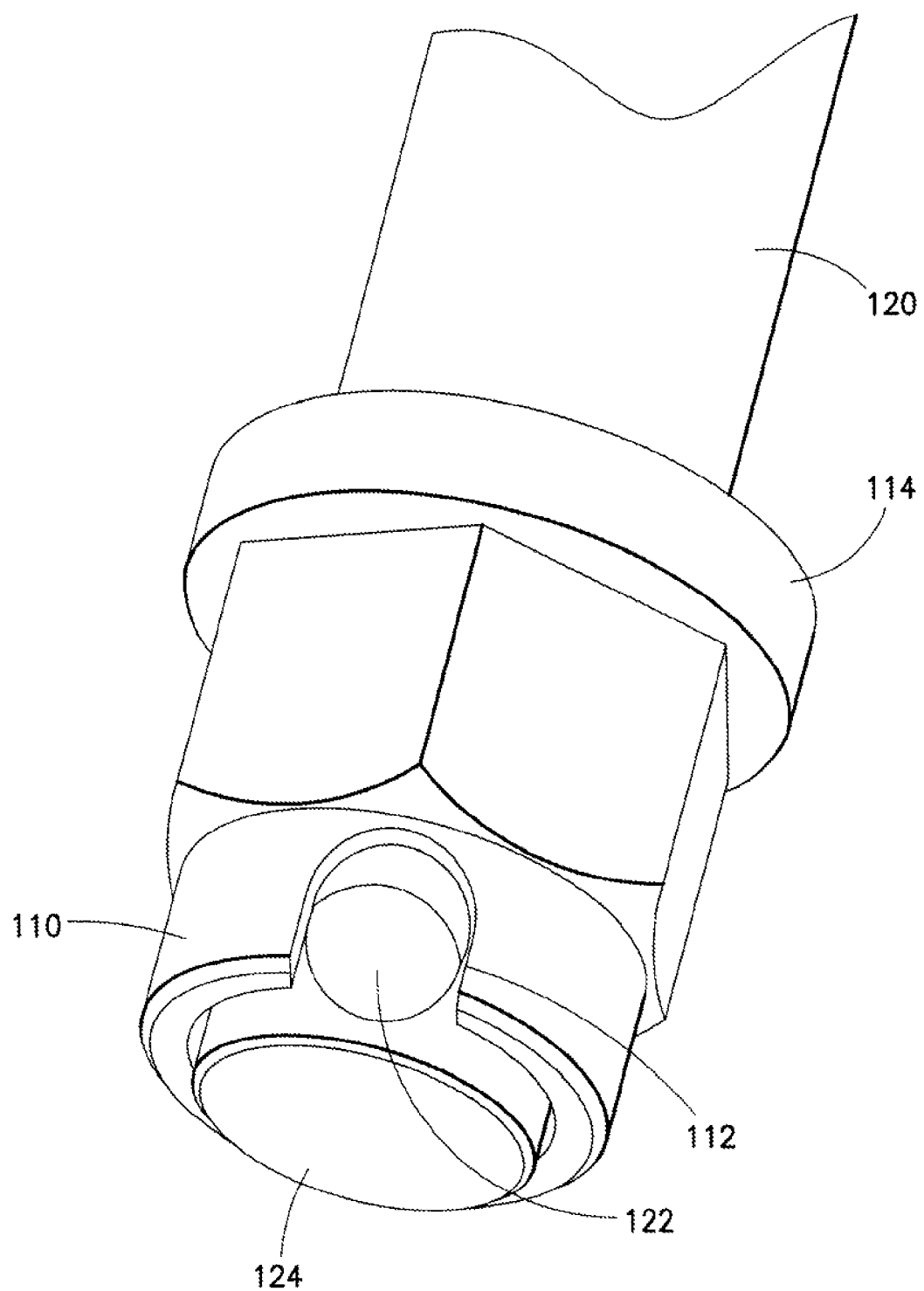
FIG. 10 depicts an alternate embodiment of the fastening device shown in FIG. 9, wherein the threaded head fastener is fastened onto the stud.
Figure 13:
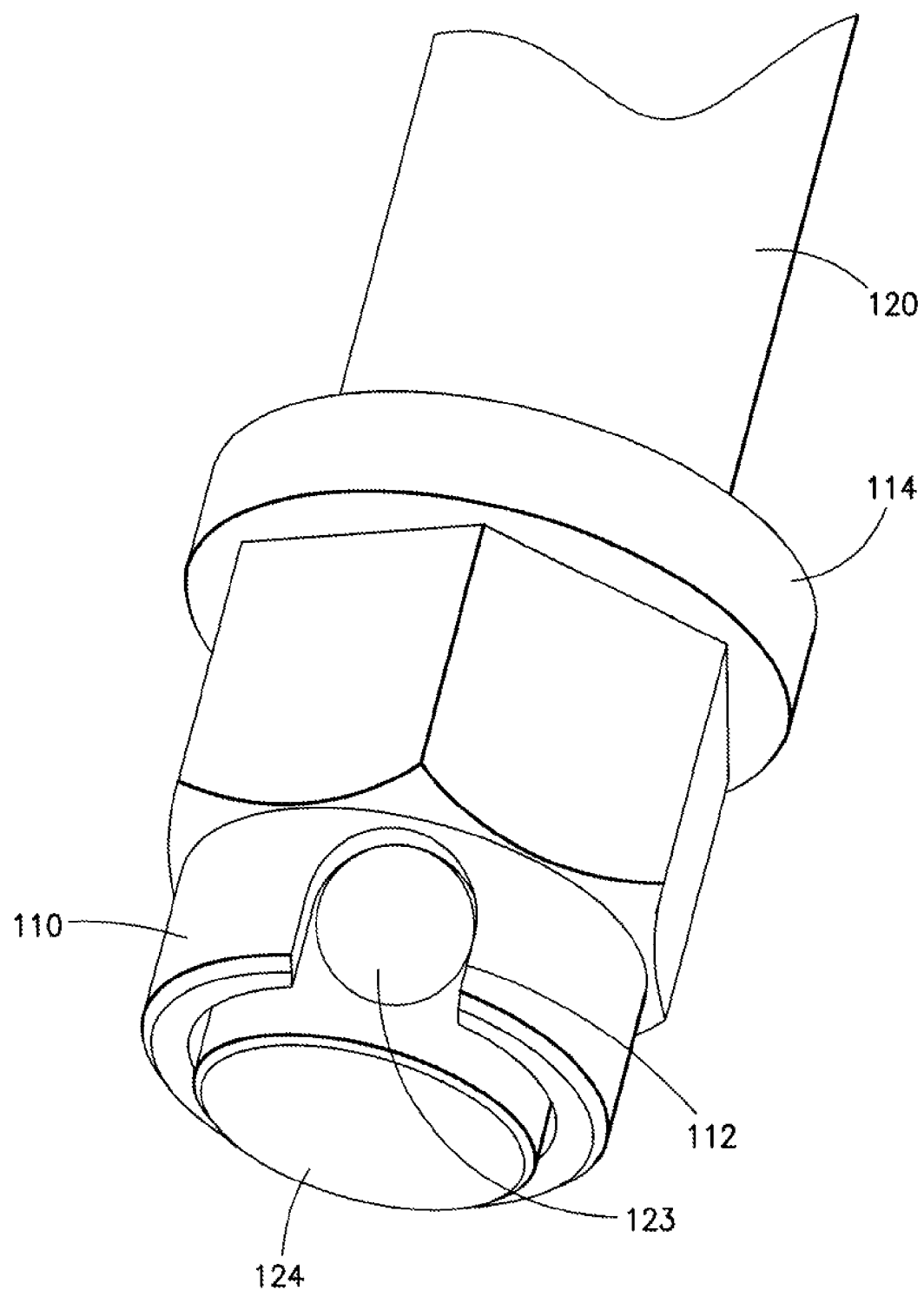
FIG. 13 depicts an embodiment of a fastening device, including a threaded head fastener with stop indentations and a stud with ball-bearing shaped stop projections.

Referring now to FIG. 10, an assembled stud and threaded head fastener 110 is shown. To assemble the threaded head fastener and stud into this configuration, the second end 124 of the stud 120 is inserted into the base 114 of the threaded head fastener 110. The stop projections 122 may be either in a depressed or raised position. In the depressed position, the stop projections 122 are substantially within the stud 120, thereby allowing for the head fastener to rotate and fasten onto the stud. The stop projections 122 are also sloped such that upon insertion of the stud 120 into the head fastener 110, the stop projections 122 are pushed into the depressed position, allowing the head fastener 110 to pass over the stop projections 122 so that the head fastener 110 may be fastened onto the stud 120. Rotational fastening continues until the stop projections 122 re-emerge into the stop indentations 112 on the head fastener 110. The stop projections 122 may be spring loaded so that they are biased towards the raised position. This allows the stop projections 122 to spring out of the stud once they are aligned with the stop indentations 112 of the head fastener 110, thereby locking the stud 110 into a fixed position relative to the head fastener 120. In FIG. 13, a ball-bearing shaped projection 123 is shown and serves the same function as stop projection 122. The ball-bearing shaped projection 123 may be depressed into the stud 120 and may retain the head fastener 110 in a fastened position.

Figure 11C:
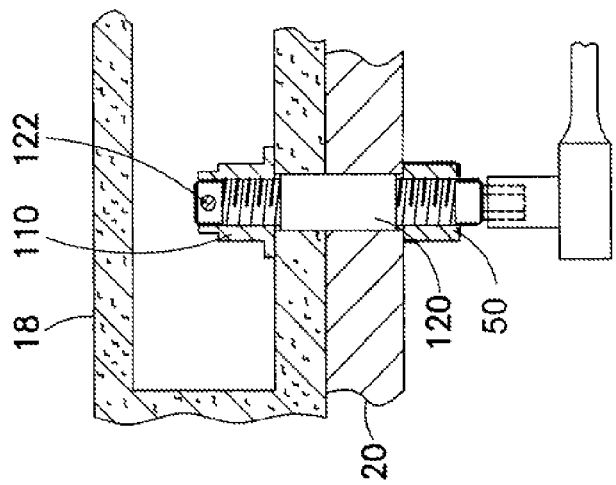
FIG. 11 depicts an alternate embodiment of the device depicted n FIG. 9 as utilized in a low-clearance region of a wing-side of body joint.
Figure 11B:
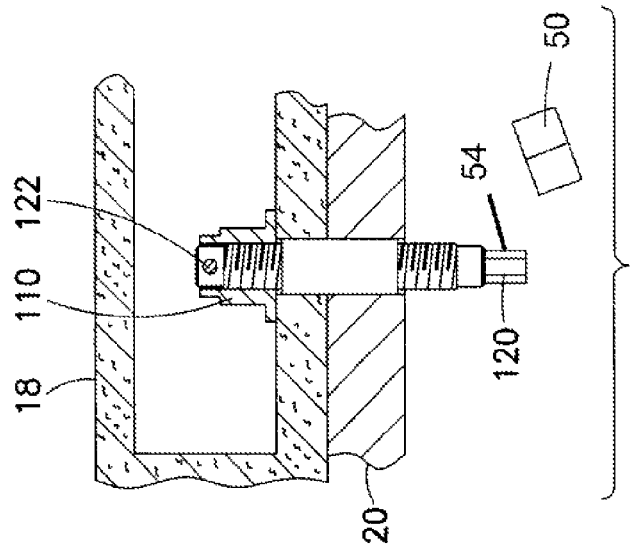
Figure 11A:
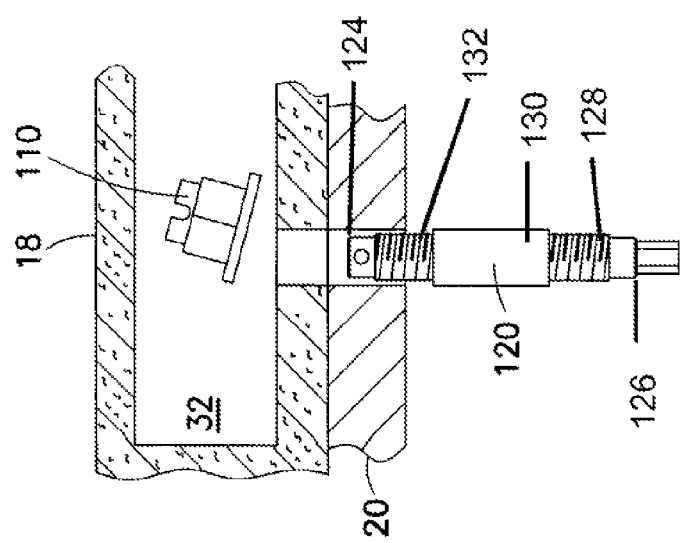

Referring now to FIGS. 11A-11C, a wing-side of body joint utilizing the fastener with self-indexing nut system is shown, as well as a method of assembling a fastener with self-indexing nut system.

The fastener with self-indexing nut system comprises a stud 120 with a threaded head fastener 110 and a threaded tail fastener 50 or nut. The stud 120 comprises a first end 126 and a second end 124, and a stud 120 extending therebetween. Spaced apart from the first end is a first threaded section 128 which runs to an unthreaded middle section 130. Spaced apart from the second end 124 is a second threaded section 132 which runs to the unthreaded middle section 130.

A wing-side of body joint comprises a chord element 18 and skin element 20 which define a reduced clearance region 32. A stud 120 with stop projections 122 fits through the chord 18 and skin 20 into the reduced clearance region 32. The second threaded section 132 is fastened to a threaded head fastener 110. A threaded tail fastener or nut 50 is attached to the first threaded section. A wrenching feature 54 is found adjacent to the first end 126 of the stud 120.

For assembly, the threaded head fastener 110 is placed within the low-clearance region 32, over the hole through which the stud 120 is to be inserted. The stud 120 is then inserted and the head fastener 110 is rotated until the stop projections 122 emerge through the stop indentations 112. At this point, a threaded tail fastener is fastened to the non-blind end and the wrenching feature may be broken off. During installation of the threaded tail fastener, the wrenching feature is held to prevent turning of the stud within the hole, thereby preventing scoring of the stud hole.

Figure 12:
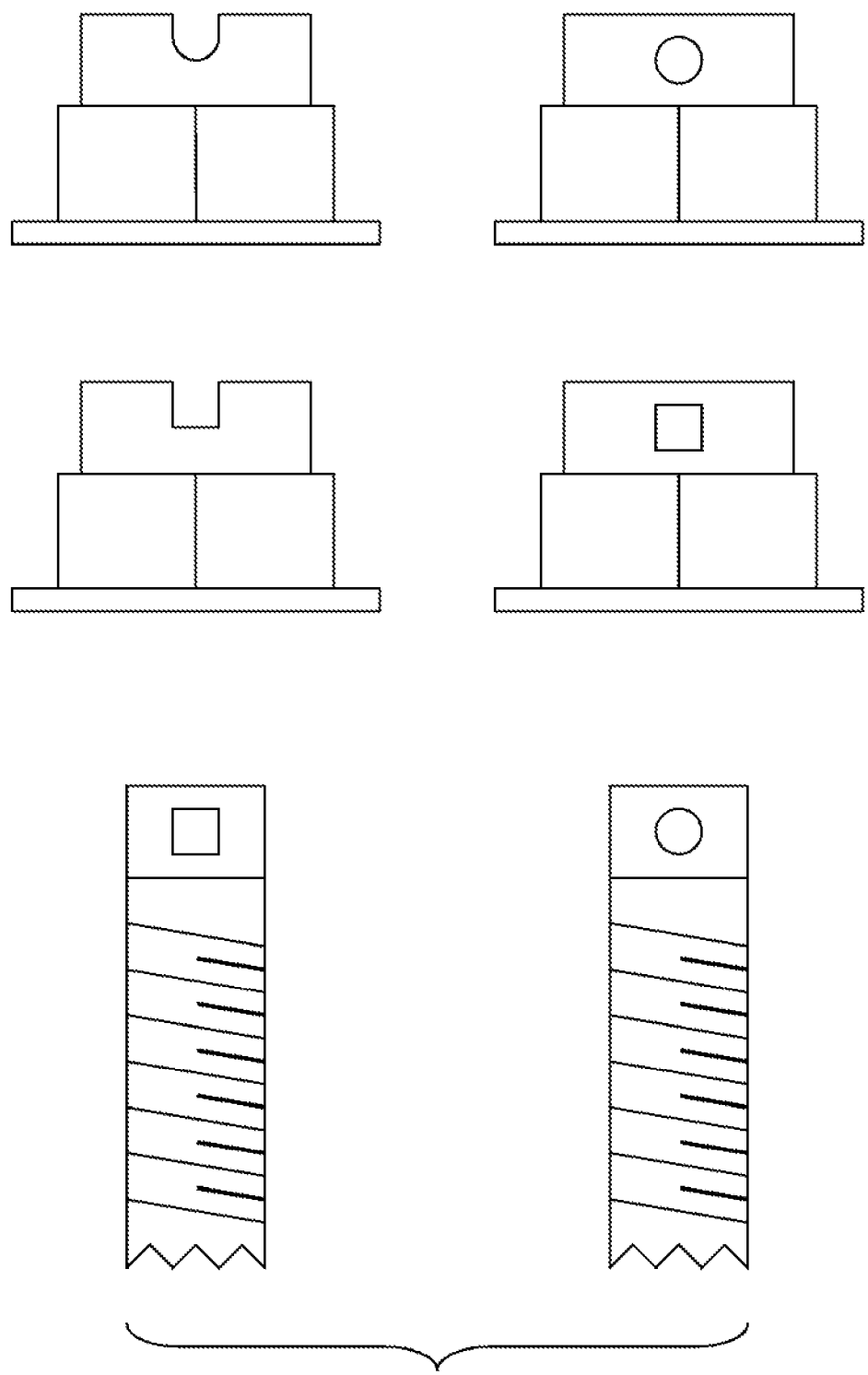
FIG. 12 depicts alternate embodiments of stop projections and stop indentations of the fastening device depicted in FIG. 9.

Referring now to FIG. 12, alternate stop indentations and stop projections are shown. Note that the stop projections may be found towards the end of the head fastener or spaced apart from the head fastener and that stop indentations and stop projections may be of any shape, including but not limited to circular, rectangular, square, triangular, hexagonal, star shaped, or any other appropriate shape.

While the invention has been described in connection with one or more embodiments, it is to be understood that the specific mechanisms and techniques which have been described are merely illustrative of the principles of the invention, numerous modifications may be made to the methods and apparatus described without departing from the spirit and scope of the invention as defined by the appended claims.

We claim:

1. A method of coupling a first member to a second member, comprising:

positioning a threaded head fastener having a top end and a bottom end over a hole extending through the first member and the second member, such that the bottom end is proximate an outer surface of the first member, the threaded head fastener comprising a stop indentation in an outer surface of the top end;

providing a cylindrical stud having a first end face, a second end face, a first threaded area spaced from said first end face and extending to an unthreaded central area, a second threaded area spaced from said second end face and extending to said unthreaded central area, and an unthreaded stop projection area extending between said second threaded area and said second end face, said unthreaded stop projection area having a stop projection;

rotating the threaded head fastener around the second threaded area until the stop projection engages with the stop indentation in the outer surface of the top end of the threaded head fastener to prevent rotation of the threaded head fastener with respect to the cylindrical stud;

rotating a threaded tail fastener around the first threaded area; and engaging a wrenching feature positioned adjacent to and affixed to the first end face of the cylindrical stud to restrain the cylindrical stud while the threaded tail fastener is rotated.

2. The method of claim 1, wherein the wrenching feature comprises a spline recess formed in the first end face of the cylindrical stud.

3. The method of claim 1, wherein:
the wrenching feature extends past the first end face; and
the method further comprises breaking off the wrenching feature after the first member is secured against the second member.

4. The method of claim 1, further comprising inserting the second end face of the cylindrical stud through the hole in the second member and then the hole in the first member.

5. The method of claim 1, wherein:
the stop projection is spring loaded; and
rotating the threaded head fastener further comprises rotating the threaded head fastener until the stop projection protrudes out from the stop indentation.

6. The method of claim 5, wherein:
the stop projection is movable between a depressed position and a raised position; and
the stop projection is in the depressed position while the threaded head fastener is being rotating and the stop projection moves to the raised position upon protruding out from the stop indentation.

7. A method of coupling a skin element to a chord assembly having an internal reduced clearance section in an aerospace wing side-of-body joint assembly comprising:

positioning a threaded head fastener having a top end and a bottom end in the internal reduced clearance section over a hole extending through the skin element and the chord element, such that the bottom end is proximate an inner surface of the chord element, the threaded head fastener comprising a stop indentation in an outer surface of the top end;

providing a cylindrical stud having a first end face, a second end face, a first threaded area spaced from said first end face and extending to an unthreaded central area, a second threaded area spaced from said second end face and extending to the unthreaded central area, and an unthreaded stop projection area extending between the second threaded area and the second end face, the unthreaded stop projection area having a stop projection;

rotating the threaded head fastener around the second threaded area until the stop projection engages with the stop indentation in the outer surface of the top end of the threaded head fastener to prevent rotation of the threaded head fastener with respect to the cylindrical stud;

engaging a threaded tail fastener with the first threaded area;

rotating the threaded tail fastener until the skin element is secured against the chord element; and engaging a wrenching feature positioned adjacent to and affixed to the first end face of the cylindrical stud to restrain the cylindrical stud while the threaded tail fastener is rotated.

8. The method of claim 7, wherein the wrenching feature comprises a spline recess formed in the first end face of the cylindrical stud.

9. The method of claim 7, wherein:
the wrenching feature extends past the first end face; and
the method further comprises breaking off said wrenching feature after the skin element is secured against the chord element.

10. The method of claim 7, further comprising inserting the second end face of the cylindrical stud through the hole in the skin element and then the hole in the chord assembly.

11. The method of claim 7, wherein:
the stop projection is spring loaded; and
rotating said threaded head fastener further comprises rotating said threaded head fastener until said stop projection protrudes out from said stop indentation.

12. The method of claim 11, wherein:
said stop projection is movable between a depressed position and a raised position; and
said stop projection is in said depressed position while said threaded head fastener is being rotating and said stop projection moves to said raised position upon protruding out from said stop indentation.

* * * * *